United States Patent [19]

Kusuki et al.

[11] Patent Number: 5,064,446
[45] Date of Patent: Nov. 12, 1991

[54] METHOD OF PREPARING HIGH PURITY LIGHT GAS BY MULTIPLE-STEP GAS SEPARATION

[75] Inventors: Yoshihiro Kusuki, Ichihara; Kazuhiko Ishihara, Minato, both of Japan

[73] Assignee: Ube Industries, Ltd., Yamaguchi, Japan

[21] Appl. No.: 199,319

[22] Filed: May 26, 1988

[30] Foreign Application Priority Data

May 29, 1987 [JP] Japan .................. 62-134303

[51] Int. Cl.$^5$ .................. B01D 53/22; B01D 71/64
[52] U.S. Cl. .................. 55/16; 55/66; 55/68
[58] Field of Search .................. 55/16, 68, 158, 66

[56] References Cited

U.S. PATENT DOCUMENTS

| | | | |
|---|---|---|---|
| 2,540,152 | 2/1951 | Weller | 55/16 |
| 2,617,493 | 11/1952 | Jones | 55/16 |
| 2,626,679 | 1/1953 | Harlow | 55/16 |
| 2,970,106 | 1/1961 | Binning et al. | 55/16 X |
| 3,246,449 | 4/1966 | Stern et al. | 55/16 |
| 3,246,450 | 4/1966 | Stern et al. | 55/16 |
| 3,250,080 | 5/1966 | Garwin | 55/16 X |
| 3,324,626 | 6/1967 | Dresser et al. | 55/16 |
| 3,339,341 | 9/1967 | Maxwell et al. | 55/16 |
| 3,713,271 | 1/1973 | Franz et al. | 55/16 |
| 4,104,037 | 8/1978 | Garrett et al. | 55/16 |
| 4,119,417 | 10/1978 | Heki et al. | 55/16 X |
| 4,130,403 | 12/1978 | Cooley et al. | 55/16 |
| 4,140,499 | 2/1979 | Ozaki et al. | 55/16 X |
| 4,264,338 | 4/1981 | Null | 55/16 |
| 4,435,191 | 3/1984 | Graham | 55/16 |
| 4,474,586 | 10/1984 | Rice | 55/16 |
| 4,548,619 | 10/1985 | Steacy | 55/16 |
| 4,597,777 | 7/1986 | Graham | 55/16 |
| 4,659,343 | 4/1987 | Kelly | 55/16 |
| 4,701,187 | 10/1987 | Choe et al. | 55/16 |
| 4,718,921 | 1/1988 | Makino et al. | 55/16 |

FOREIGN PATENT DOCUMENTS

| | | | |
|---|---|---|---|
| 51469 | 5/1982 | European Pat. Off. | 55/16 |
| 75431 | 3/1983 | European Pat. Off. | 55/16 |
| 2841760 | 4/1979 | Fed. Rep. of Germany | 55/16 |
| 207827 | 11/1984 | Japan | 55/16 |

*Primary Examiner*—Robert Spitzer
*Attorney, Agent, or Firm*—Burgess, Ryan and Wayne

[57] ABSTRACT

A purified light gas consisting of hydrogen or helium and having a high purity of, for example, 99.99% or more is prepared from a feed gas containing at least 90 molar % or more of $H_2$ or He and substantially no $CO_2$ by gas-separating the feed gas through a plurality of gas-separating membrane modules each comprising at least one polymeric gas-separating membrane and having a gas-permeating ratio $P_A/P_{CH_4}$ of 100 or more, wherein $P_A$ is a permeating rate of the light gas and $P_{CH_4}$ is a permeating rate of methane gas, in such a manner that each fraction of the feed gas permeated through and delivered from a preceding membrane module is fed to a next membrane module under the pressure, per se, of the delivered fraction of the feed gas without pressurizing the delivered fraction.

8 Claims, 6 Drawing Sheets

METHOD OF PREPARING HIGH PURITY LIGHT GAS BY MULTIPLE-STEP GAS SEPARATION

BACKGROUND OF THE INVENTION

1. Field of the Invention

The present invention relates to a method for preparing a high purity light gas consisting of a member selected from the group consisting of hydrogen or helium. More particularly, the present invention relates to a method for preparing a light gas consisting of hydrogen or helium and having a high purity of 99.99 molar % or more when a content of water is omitted from the calculation of the purity, by a multiple step gas-separating procedure in which a feed gas to be purified is selectively permeated successively through a plurality of gas-separating polymeric membrane modules.

The term "light gas" used herein refers to a gas consisting essentially of hydrogen or helium.

Also, the term "gas-separating membrane module" used herein refers to a module comprising at least one polymeric membrane which selectively allows a light gas to permeate therethrough to concentrate the light gas and to separate impurities other than water therefrom.

2. Description of the Related Arts

In a known method used industrially a hydrogen or helium gas is concentrated or refined from a mixture gas containing hydrogen or helium by a low temperature processing method or an absorption method, and recently, it has become known that the concentration or refining of the hydrogen or helium gas can be conducted by using a gas-separating polymeric membrane.

But this polymeric membrane gas-separating method has the following advantages and disadvantages.

Advantages (A) The gas separating apparatus is compact and cheap, and requires little maintenance therefor.

(B) The gas-separating procedure is simple and can be stably operated under a wide range of operating conditions.

(C) When the feed gas is supplied under a sufficiently high pressure, the gas-separating operation can be effected without an additional supply of energy to the operation system.

(D) A fraction of the feed gas, which has not permeated through the gas-separating membrane, can maintain a pressure at a level substantially the same as the original level.

Disadvantages (A) A fraction of the feed gas, which has permeated through the gas-separating membrane, exhibits a significantly reduced pressure in comparison with the original pressure of the feed gas.

(B) To obtain a high purity hydrogen or helium gas having a purity of 99.99 molar % or more in a dry condition, the gas-separating operation must be repeatedly carried out in a large number of gas-separating membranes.

(C) When a feed gas is subjected to a plurality of gas-separating operations through a plurality of gas-separating membranes, the permeation of the feed gas through each gas-separating membrane reduces the pressure of the feed gas. Accordingly, a fraction of the feed gas, which has permeated through a gas-separating membrane and thus has a reduced pressure, must be compressed to elevate the pressure thereof before feeding it to a next gas-separating operation: This compression requires a large amount of energy.

In view of the above-mentioned advantages and disadvantages, it is conventionally believed that the polymeric membrane gas-separating method is useful for briefly separating a hydrogen or helium gas from a feed gas, at a low cost, but is not beneficial for producing a high purity hydrogen or helium gas having a purity of 99.99 molar % or more.

Japanese Examined Patent Publication (Kokoku) No. 44-5526 and Japanese Unexamined Patent Publication (Kokai) No. 54-72778 disclose a method for purifying and concentrating a hydrogen or helium gas by using a plurality of gas-separating polymeric membranes arranged in multiple steps; the hydrogen or helium gas being able to easily permeate through the membranes.

Nevertheless, the gas-separating method disclosed in these publications is disadvantageous in that a pressure-raising operation, for example, a compressing operation, must be applied to a fraction of a feed gas which has permeated through a preceding gas-separating membrane, before the fraction is fed to a next gas-separating membrane.

Namely, the necessity for a pressure-raising operation in the above-mentioned conventional method increases the cost thereof and thus brings a decreased cost-efficiency in the production of the high purity hydrogen or helium gas.

SUMMARY OF THE INVENTION

An object of the present invention is to provide a method for preparing a high purity light gas consisting of a member selected from the group consisting of hydrogen and helium from a feed gas containing the light gas, by using a plurality of gas-separating polymeric membrane modules, at a high efficiency and a low cost.

Another object of the present invention is to provide a method for preparing a light gas consisting of a member selected from the group consisting of hydrogen and helium, and having a high purity of 99.99 molar % or more when a content of water is omitted from the calculation of the purity, by removing therefrom organic substances, especially hydrocarbon compounds, for example, methane and ethane and inorganic substances, for example, nitrogen and oxygen, through a plurality of gas-separating polymeric membrane modules which can be simply and easily operated, and with a reduced energy consumption.

The above-mentioned objects can be attained by the method of the present invention, which comprises subjecting a feed gas containing at least 90 molar % of a light gas consisting of a member selected from the group consisting of hydrogen and helium and substantially no carbon dioxide to a gas separating procedure in a plurality of steps, through a plurality of gas-separating membrane modules, each gas-separating membrane module comprising at least one gas-separating membrane and having a gas-permeating rate ratio $P_A/P_{CH_4}$ of 100 or more, wherein $P_A$ represents a permeating rate of the light gas and $P_{CH_4}$ represents a permeating rate of methane gas, in such a manner that a fraction of the feed gas, which has permeated through and has been delivered from a preceding gas-separating membrane module, is fed to a next gas-separating membrane module without an increase of the pressure of the delivered fraction of the feed gas.

DESCRIPTION OF THE PREFERRED EMBODIMENTS

Figure 14:
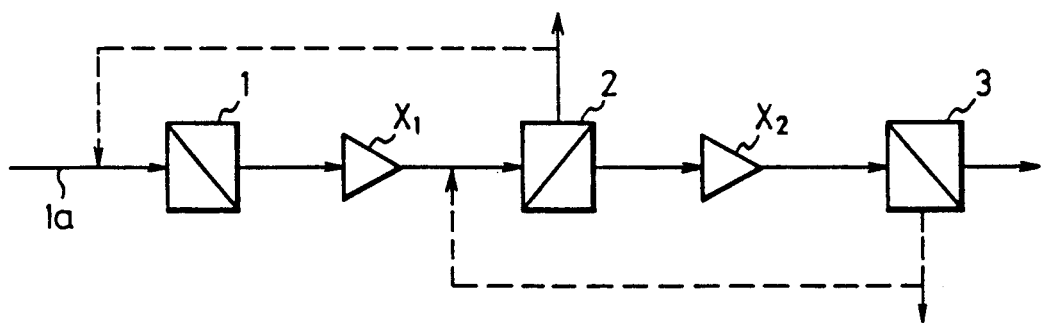

In a conventional method for preparing a high purity light gas consisting of hydrogen or helium, a feed gas is successively permeated through a plurality of gas-separating polymeric membrane modules. For example, referring to FIG. 14, a feed gas is fed to a first gas-separating membrane module 1 through a feeding path 1a and is permeated through the membrane module 1. A pressure loss of the feed gas is inevitable in the membrane module 1, i.e., the pressure of a first fraction of the feed gas which has passed through and has been delivered from the membrane module 1 become lower than the original pressure of the feed gas. The pressure of the first fraction of the feed gas is increased by a first pressure-increasing apparatus $X_1$, for example, a compressor, and then fed to a second gas-separating membrane module 2. A second fraction of the feed gas which has passed through and has been delivered from the second membrane modules 2 is fed to a second pressure-increasing apparatus $X_2$. A first residual fraction of the feed gas which has not passed through the second membrane modules 2 is discharged or returned to the feeding path 1a and mixed with a fresh feed gas to be fed to the first membrane module 1.

The pressure-increased second fraction of the feed gas is fed to a third gas-separating membrane module 3. The resultant third fraction of the feed gas, which has passed through the third membrane module, is collected as a high purity gas. A second residual fraction of the feed gas, which has not passed through the third membrane module 3, is discharged or returned to a second membrane module 2.

In the above-mentioned conventional gas-separating method and apparatus, the necessity for the provision of the pressure-increasing apparatuses $X_1$ and $X_2$ increases the cost of the method and apparatus, and thus brings a low cost-efficiency.

The inventors of the present invention found that, when a specific gas-separating polymeric membrane is used, a high purity hydrogen or helium gas having a purity of, for example, 99.99 molar % or more, when a content of water is omitted in the calculation of the purity, can be prepared by successively permeating a feed gas through a plurality of gas-separating membrane modules, without increasing a pressure of a fraction of the feed gas which has permeated through a preceding membrane module and has been delivered therefrom. That is, in the method of the present invention, a feed gas containing at least 90 molar % of a light gas consisting of a member selected from the group consisting of hydrogen and helium and substantially no carbon dioxide is subjected to a gas-separating procedure in a plurality of steps.

The feed gas usable for the method of the present invention may contain water (moisture), but preferably, the feed gas is substantially free from water. In this gas-separating procedure, the feed gas is successively permeated through a plurality of gas-separating membrane modules, each comprising at least one polymeric gas-separating membrane and having a gas-permeating rate ratio $P_A/P_{CH_4}$ of 100 or more, wherein $P_A$ represents a permeating rate of the light gas and $P_{CH_4}$ represents a permeating rate of methane gas, in a manner such that a fraction of the feed gas which has permeated through and has been delivered from a preceding gas-separating membrane module is directly fed to a next gas-separating membrane module, without increasing the pressure of the delivered fraction of the feed gas.

The gas-separating polymeric membrane module usable for the method of the present invention has a gas-permeating rate ratio $P_A/P_{CH_4}$, that is, $P_{H_2}/P_{CH_4}$ or $P_{He}/P_{CH_4}$, of 100 or more, preferably 150 or more, more preferably 200 or more. This type of membrane module can be prepared from aromatic imide polymer membranes as disclosed in Japanese Unexamined Patent Publication (Kokai) No. 61-19815 and U.S. Pat. No. 4,718,921.

The gas-permeating rate of a gas-separating membrane module was determined in the following manner.

A gas-separating polymeric membrane module to be tested was fixed to a cell made of stainless steel to provide a gas-separating apparatus.

A feed gas to be tested was fed to the gas-separating apparatus under a pressure of 2 kg/cm² and at a temperature of 45° C., and an amount of a fraction of the feed gas permeated through the membrane module was measured by a flowmeter. The permeation rate of the permeated gas was calculated in accordance with the following equation:

$$P = \frac{Ga}{A \times T \times DP}$$

wherein P represents a permeation rate of the permeated gas in N-cm³/cm²·sec·cmHg, Ga represents a total amount the permeated gas in N-cm³, A represents a gas-permeating area of the gas-separating membrane module in cm², T represents a gas-permeating time in seconds, and DP represents a differential partial pressure of the permeated gas in cmHg.

The polymeric membrane module usable for the present invention is preferably composed of a number of gas-permeable hollow fibers which have a large gas-permeating area, but the membrane module may be composed of a wound gas-permeable membrane, a flat gas-permeable membrane or a flat sheet consisting of two or more superposed gas-permeable membranes.

The hollow fibers usable as a gas-permeable membrane module preferably have an outside diameter of 50 to 2000 $\mu$m, more preferably 200 to 1000 $\mu$m and a wall thickness of 10 to 200 $\mu$m, more preferably 50 to 150 $\mu$m. When the outside diameter is too small, the resultant hollow fiber causes an excessively large pressure loss of a gas flowing through the hollow of the fiber, and when the outside diameter is too large, the resultant membrane module has an excessively decreased gas-permeating area per unit volume of the module.

The hollow fiber preferably has a ratio Th/Od of from 0.1 to 0.3, wherein Od represents an outside diameter of the hollow fiber and Th represents a thickness of wall of the hollow fiber, that is $$Th = \frac{Od - Id}{2},$$

wherein Id represents an inside diameter of the hollow fiber.

When the wall thickness Th is too small, the resultant hollow fiber exhibits an excessively small resistance to pressure and is easily crushed flat, and when the wall thickness Th is too large, the resultant hollow fiber sometimes exhibits a small gas-permeating rate.

In the method of the present invention, the feed gas to be purified contains at least 90 molar % of the light gas consisting of hydrogen or helium and is substantially completely free from carbon dioxide.

Figure 1:
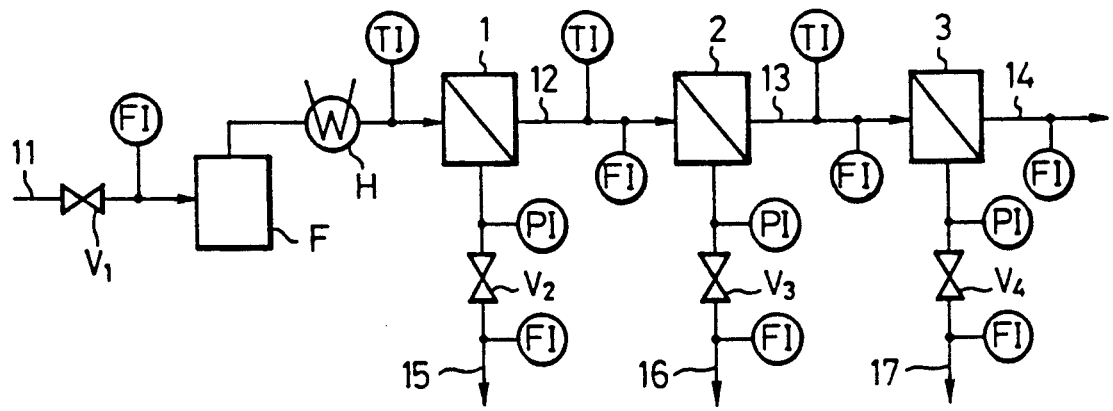
FIGS. 1 to 9 respectively show a flow sheet of an embodiment of the method of the present invention.

In the method of the present invention, the feed gas is permeated through a plurality of gas-separating polymeric membrane modules in a manner such that a fraction of the feed gas which has been permeated through and delivered from a preceding membrane module is directly fed to a next membrane module without increasing the pressure of the delivered fraction. Referring to FIG. 1 showing a three step gas-separating procedure, a feed gas supplied through a feeding line 11 is fed to a first gas-separating polymeric membrane module 1 through a flow rate-regulating valve $V_1$, a guard filter F and a temperature-regulator H, at a predetermined flow rate and temperature and under a predetermined pressure, which can be detected by a flowmeter FI, a thermometer TI, and a pressure meter PI. The guard filter is used to eliminate dust and/or mist from the feed gas and to protect the gas-separating polymeric membrane module from contamination by impurities. Accordingly, when the feed gas is clean and is free from dust and mist, the guard filter is omitted from the gas-separating apparatus.

The temperature regulator is used for two purposes, as follows.

(1) Since the gas-separating efficiency of the polymeric membrane is variable to a large extent, depending on the temperature of the gas-separating system, the temperature of the feed gas must be adjusted to a predetermined level so that the gas-separating membrane is constantly maintained at a predetermined temperature and stably exhibits a constant gas-separating efficiency.

(2) The gas-separating polymeric membrane must be maintained in a dry condition throughout the gas-separating procedure. If the polymeric membrane is wetted with a liquid contained in the feed gas, the gas-separating efficiency of the polymeric membrane varies to a large extent and sometimes is damaged by the liquid. Accordingly, it is important that the feed gas is dried before coming into contact with the polymeric membrane. For this purpose, the feed gas is heated to a predetermined temperature at a position upstream of the polymeric membrane module.

If the feed gas has a predetermined temperature, and is completely dry and thus does not cause the polymeric membrane to be wetted, the temperature regulator can be omitted from the gas-separating apparatus.

Generally, the feed gas is preferably fed to the first gas-separating polymeric membrane module at a pressure high enough to cause a pressure of a fraction of the feed gas, which has permeated through and has been delivered from a last membrane module for a final gas-separating operation, to be 30 mmHg Ab or more, preferably an ambient atmospheric pressure or more. For example, when the gas-separating procedure is carried out through three gas-separating membrane modules as shown in FIG. 1, the original pressure of the feed gas to be fed to the first membrane module is preferably adjusted to a level of 10 to 150 $kg/cm^2 \cdot G$. Also, the temperature of the feed gas is preferably regulated to a level of 0° C. to 100° C. by the temperature-regulator.

In the first membrane module 1 of FIG. 1, the feed gas is separated into a first fraction which has permeated through the first membrane module 1 and a first residual fraction which has not permeated through the first membrane module 1.

The first permeated fraction of the feed gas is fed to a second gas-separating polymeric membrane module 2 through a flow line 12 without increasing the pressure thereof. The first non-permeated fraction of the feed gas is discharged from the first membrane module 1 through a flow line 15 and a flow rate-regulating valve $V_2$.

In the second membrane module 2 of FIG. 1, the first permeated fraction of the feed gas is divided into a second permeated fraction and a second non-permeated fraction of the feed gas.

The second permeated fraction of the feed gas is fed to a third gas-separating polymeric membrane module 3 through a flow line 13 and the second non-permeated fraction of the feed gas is discharged from the second membrane module 2 through a flow rate-regulating valve $V_3$ and a flow line 16.

Figure 2:
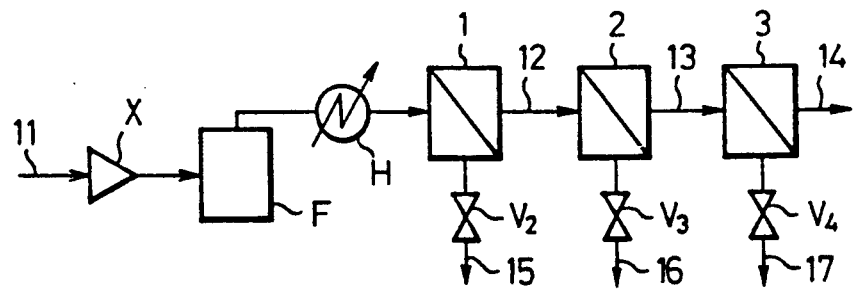

In the third membrane module 3 of FIG. 1, the second permeated fraction of the feed gas is separated into a third permeated fraction and a third non-permeated fraction of the feed gas. The third permeated fraction of the feed gas is collected as a high purity gas through a flow line 14. The third non-permeated fraction of the feed gas is discharged through a flow rate-regulating valve $V_4$ and a flow line 17.

Where the feed gas to be fed to the gas-separating apparatus has a pressure which is not high enough to accomplish the method of the present invention, the pressure of the feed gas is increased by using a pressure-increasing apparatus, for example, a compressor, as shown by X in FIG. 2.

Referring to FIG. 2, the pressure-increased feed gas to be fed to the gas-separating apparatus is filtered by a guard filter F and heated by a temperature regulator H, if necessary, and then is successively gas-separated by the first, second, and third gas-separating polymeric membrane modules 1, 2, and 3, in the same manner as described above.

Figure 3:
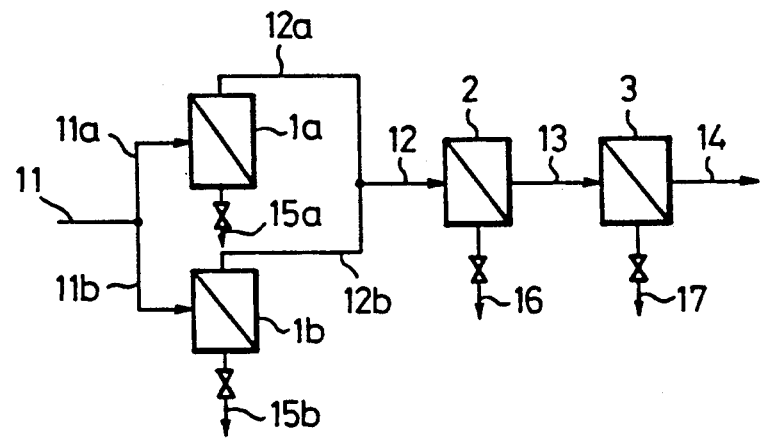

Referring to FIG. 3, a feed gas supplied through a feed line 11 is fed to two separate first gas-separating polymeric membrane modules 1a and 1b through flow lines 11a and 11b, respectively, and is separated into two first permeated fractions and two first non-permeated fractions of the feed gas in the two separate first membrane modules 1a and 1b.

The first permeated fractions delivered from the first membrane modules 1a and 1b through flow lines 12a and 12b are mixed together and directly fed into a second membrane module 2 through a single flow line 12 without increasing the pressure thereof. The first non-permeated fractions of the feed gas are separately discharged from the first membrane modules 1a and 1b through flow lines 15a and 15b, respectively. The second and third gas-separating operations are carried out in the same manner as mentioned above.

Figure 4:
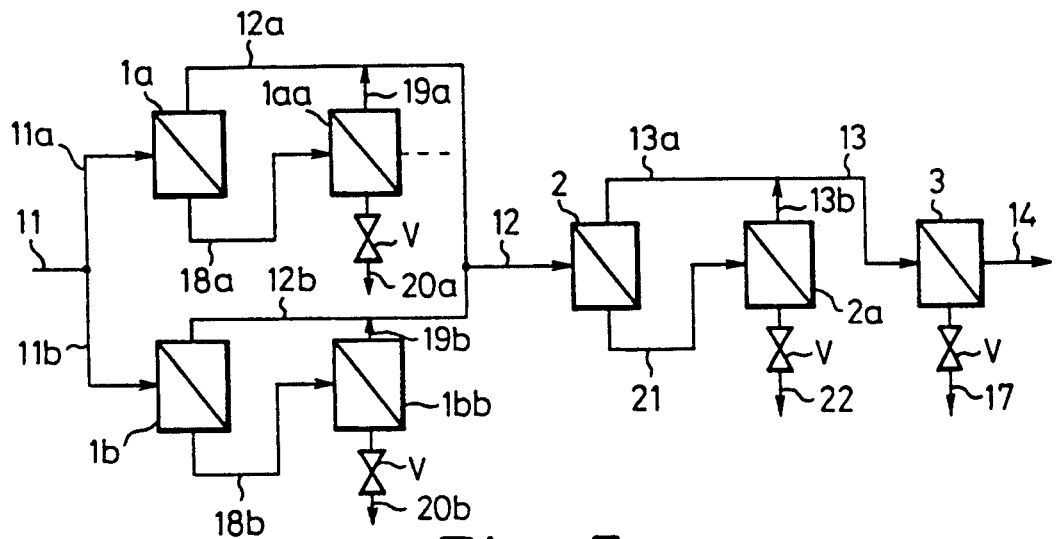

In an embodiment of the method of the present invention as shown in FIG. 4, a feed gas is divided into two portions thereof, each divided portion of the feed gas is gas-separated in two sub-steps in a first gas-separating step, and the first permeated fractions of the feed gas are mixed altogether and then further gas-separated in two sub-steps in a second gas-separating step.

Referring to FIG. 4, a feed gas supplied through a feed line 11 is divided into two portions thereof, and the two separate flows of the feed gas ar fed to two separate first gas-separating polymeric membrane modules 1a and 1b and are separated therein into two permeated fractions and two non-permeated fractions.

The non-permeated fractions discharged from the first membrane modules 1a and 1b are fed into additional first membrane modules 1aa and 1bb through flow lines 18a and 18b, respectively. A non-permeated fraction in the additional first membrane module 1aa is discharged through a flow line 20a, and another non-permeated fraction in the additional first membrane module 1bb is discharged through a flow line 20b.

The first permeated fractions of the feed gas delivered from the first membrane modules 1a and 1b through flow lines 12a and 12b, respectively, are mixed with the additional first permeated fractions of the feed gas delivered from the additional first membrane modules 1aa and 1bb through the flow lines 19a and 19b, respectively, and the mixed first permeated fraction of the feed gas is directly fed into a second membrane module 2 through a flow line 12 without increasing the pressure thereof.

The mixed first permeated fraction of the feed gas is separated into a second permeated fraction and a second non-permeated fraction of the feed gas by the second membrane module 2. The second non-permeated fraction is fed into an additional second membrane module 2a through a flow line 21 and is separated into an additional second permeated fraction and an additional second non-permeated fraction thereof. The additional non-permeated fraction of the feed gas is discharged from the additional membrane module 2a through a flow line 22.

The second permeated fraction delivered from the second membrane module 2 through a flow line 13a is mixed with the additional second permeated fraction of the feed gas delivered from the additional membrane module 2a through a flow line 13b and the mixed second permeated fraction of the feed gas is fed into a third gas-separating polymeric membrane module 3 through a flow line 13. The gas-separating operation by the third membrane module 3 is carried out in the same manner as mentioned above.

The additional first and second membrane modules 1aa, 1bb and 2a effectively recover the light gas (hydrogen or helium) from the non-permeated fractions of the feed gas.

Figure 5:
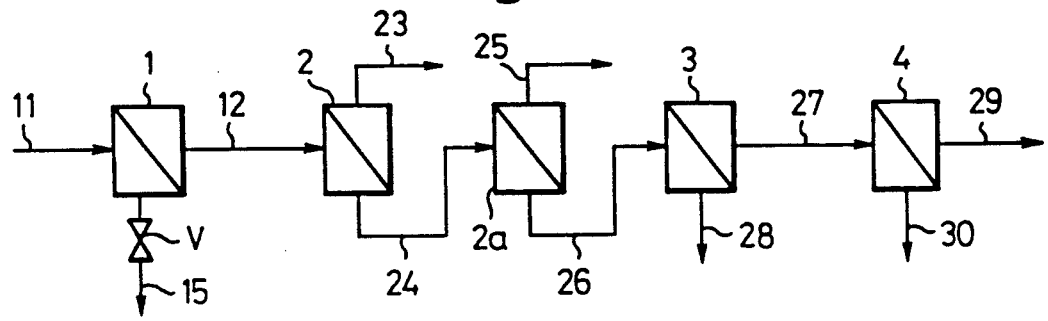

In the gas-separating method shown in FIG. 5, a feed gas is purified successively by first to fourth gas-separating operations. The second operation is carried out by using two gas-separating polymeric membrane modules arranged in series.

Referring to FIG. 5, a feed gas supplied through a feed line 11 is permeated through a first membrane module 1. A non-permeated fraction of the feed gas is discharged through a valve V and a discharge line 15. A first permeated fraction is fed to a second membrane module 2 through a flow line 12, and the resultant second permeated fraction of the feed gas is collected as a purified light gas through a flow line 23.

The resultant second non-permeated fraction of the feed gas is fed to an additional second membrane module 2a through a flow line 24, and the resultant additional second permeated fraction of the feed gas is collected as a purified light gas through a flow line 25. The resultant additional second non-permeated fraction of the feed gas is fed to a third membrane module 3 through a flow line 26, the resultant third non-permeated fraction of the feed gas is discharged through a flow line 28, and the resultant third permeated fraction of the feed gas is fed to a fourth membrane module 4 through a flow line 27.

The resultant fourth non-permeated fraction of the feed gas is discharged through a flow-line 30, and the resultant permeated fraction of the feed gas is collected as a purified light gas through a flow line 29.

Figure 6:
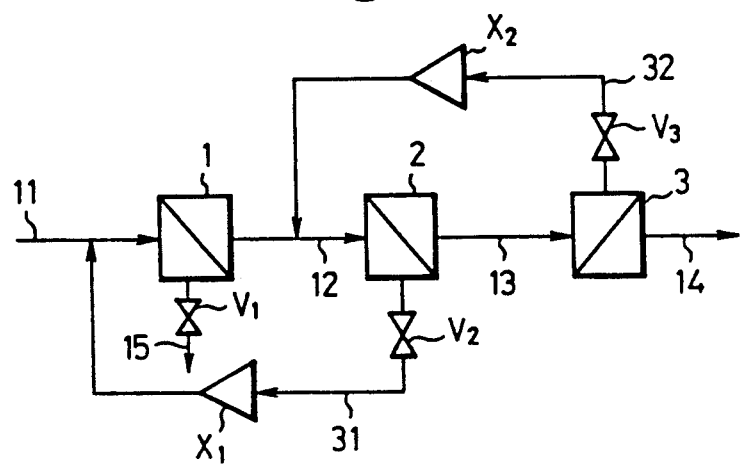
Figure 7:
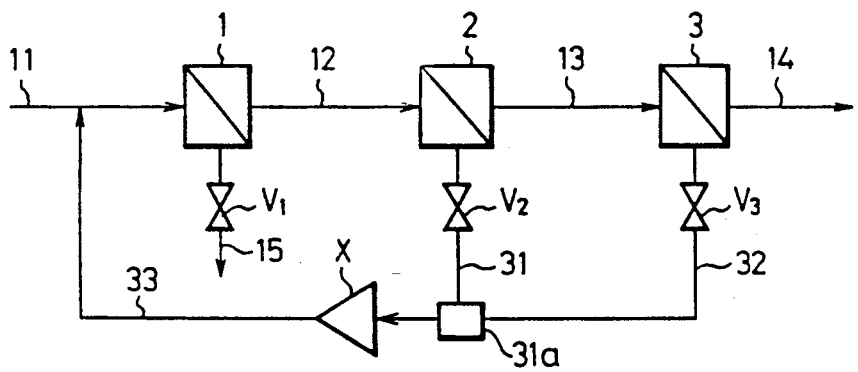

In the gas-separating procedures as shown in FIGS. 6 and 7, the pressure of a non-permeated fraction of the feed gas discharged from the second or downstream gas-separating polymeric membrane module is increased and the fraction is returned to a preceding membrane module, to recover the residual light gas in the non-permeated fraction.

Referring to FIG. 6, a feed gas supplied through a feed line 11 is fed into a first membrane module 1 and is separated into a first permeated fraction and a first non-permeated fraction of the feed gas. The first non-permeated fraction of the feed gas is discharged through a valve $V_1$ and a flow line 15. The first permeated fraction of the feed gas is fed into a second membrane module 2 and is separated into a second non-permeated fraction and a second permeated fraction of the feed gas. The second non-permeated fraction of the feed gas is withdrawn through a valve $V_2$ and a flow line 31, is pressurized to a similar pressure to that of the feed gas in the flow line 11 by a pressure-increasing apparatus $X_1$ and then is returned to a supply line 11 in which the pressure-increased second non-permeated fraction is mixed with a fresh feed gas. The mixed feed gas is fed into the first membrane module 1.

The second permeated fraction of the feed gas is fed into a third membrane module 3 and is separated into a third non-permeated fraction and a third permeated fraction of the feed gas. The third non-permeated fraction of the feed gas is withdrawn through a valve $V_3$ and a flow line 32, is pressurized to a similar pressure to that of the first permeated fraction in the flow line 12 by a pressure-increasing apparatus $X_2$, and then is returned into the flow line 12 and mixed with the first permeated fraction.

The third permeated fraction of the feed gas is collected as a purified light gas through a flow line 14.

In the gas-separating procedure shown in FIG. 7, the same first, second and third gas-separating steps as those shown in FIG. 6 are carried out except that the third non-permeated fraction of the feed gas withdrawn from the third membrane module 3 through a valve V and a flow line 32 is introduced into a receiver tank 31a and mixed with the second non-permeated fraction of the feed gas withdrawn from the second membrane module 2 through a valve $V_2$ and the flow line 31 in the receiver tank 31a, the resultant non-permeated fraction mixture of the feed gas is pressurized to a similar pressure to that of the fresh feed gas in the feed line 11 by a pressure-increasing apparatus X and then the pressurized non-permeated fraction mixture is introduced into the feed line 11 and mixed with the fresh feed gas therein. The residual light gas in the second and third non-permeated fractions can be recovered.

Figure 8:
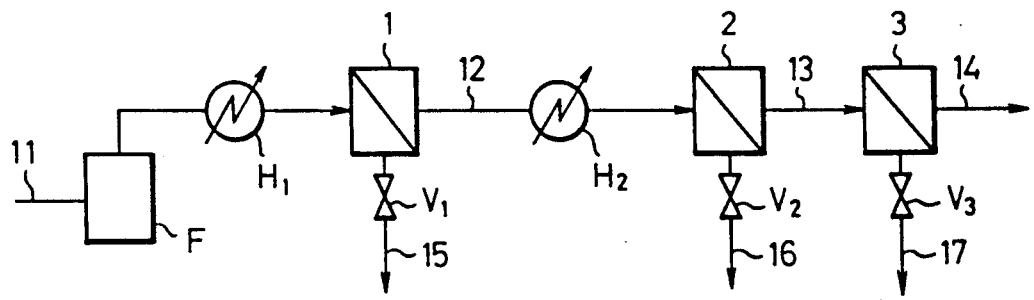
Figure 9:
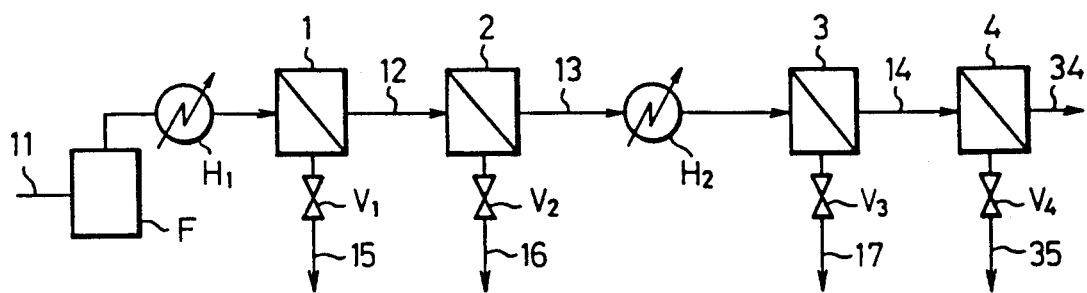

In the gas-separating procedures as shown in FIGS. 8 and 9, the temperature of the feed gas and/or a permeated fraction of the feed gas is adjusted to a predetermined level by using a temperature regulator, to control the gas-separating temperature in each membrane module to a predetermined level.

In the gas-separating procedure shown in FIG. 8, a feed gas supplied through a feed line 11 is filtered by a guard filter F, is temperature-regulated to a predetermined level by a first temperature-regulator $H_1$ and then is fed into a first gas-separating polymeric membrane module 1. In the membrane module 1, the feed gas is separated at the regulated temperature into a first permeated fraction and a first non-permeated fraction of the feed gas. The first non-permeated fraction of the feed gas is discharged through a valve $V_1$ and a flow line 15. The first permeated fraction of the feed gas delivered from the first membrane module 1 through a flow line 12 is temperature-regulated to a predetermined level by a second temperature regulator $H_2$. The temperature-regulated first permeated fraction is fed into a second membrane module 2. The resultant second non-permeated fraction of the feed gas is discharged through a valve $V_2$ and a flow line 16. The resultant second permeated fraction of the feed gas is fed into a third membrane module 3. The resultant third non-permeated fraction is discharged through a valve $V_3$ and a flow line 17. The resultant third permeated fraction is collected as a purified light gas through a flow line 14.

In the gas-separating procedure indicated in FIG. 9, the same operations as those shown in FIG. 8 are carried out except that the second temperature regulator $H_2$ is arranged between the second membrane module 2 and the third membrane module 3, and a fourth membrane module 4 is connected to the flow line 14. That is, the first permeated fraction of the feed gas delivered from the first membrane module is directly fed into the second membrane module 2 without temperature regulation, and the second permeated fraction of the feed gas delivered from the second membrane module 2 is temperature-regulated to a predetermined level by the temperature-regulator $H_2$ and then fed into a third membrane module 3. Further, the third permeated fraction of the feed gas delivered from the third membrane module 3 is fed into a fourth membrane module 4 through the flow line 14. The resultant fourth non-permeated fraction of the feed gas is discharged through a valve $V_4$ and a flow line 35, and the resultant fourth permeated fraction of the feed gas is collected as a purified light gas to the outside of the apparatus through a flow line 34.

In the method of the present invention, each gas-separating operation in each membrane module is preferably carried out at a temperature of from $-100°$ C. to $150°$ C., more preferably from $-70°$ C. to $120°$ C., still more preferably from $0°$ C. to $100°$ C.

All or some of the membrane modules may have at least one temperature-regulator (steam or electric heater and/or cooler) arranged directly before the modules. Also, all or some of the flow lines of the feed gas may be heat-insulated by covering the flow lines with a heat-insulating material.

In the method of the present invention, it is preferable that the gas-permeating areas of the membrane modules be substantially equal to each other. For this purpose, it is preferable that each membrane module cause a pressure loss of the feed gas in an amount of 30% to 80% of the preceding pressure of the feed gas to be fed into the membrane module.

For example, referring to FIG. 1 or 2, the pressure of the feed gas to be fed into the first membrane module 1 is controlled to a predetermined level by controlling the first valve $V_1$ or the pressure increasing apparatus X, for the feed gas and the second valve $V_2$ for the first non-permeated fraction of the feed gas. Also, the pressure of the first permeated fraction of the feed gas to be fed into the second membrane module 2 corresponds to 30% to 80% of the pressure of the feed gas fed into the first membrane module 1 and is controlled by the third valve $V_3$ for discharging the second non-permeated fraction of the feed gas.

Further, the pressure of the second permeated fraction of the feed gas to be fed into the third membrane module usually corresponds to from 30% to 80% of the pressure of the first permeated fraction of the feed gas and is controlled by the fourth valve $V_4$.

Where the feed gas or the purified light gas contains water (moisture or water vapor), the water is preferably removed from the feed gas or the purified light gas by a conventional method, for example, a freeze-drying method, absorption method or adsorption method.

When a purified light gas substantially free from water is required, the feed gas is preferably subjected to an absorption treatment with silica gel or a molecular sieve. In this absorption treatment, the water in the feed gas can be substantially completely removed and the resultant feed gas exhibits a dew point of $-60°$ C. or less.

The method of the present invention is very effective for preparing a purified light gas consisting of hydrogen or helium having a purity of 99.99 molar % or more when a content of water is omitted in the calculation of the purity, at a low cost with a high efficiency, by using a plurality of specific polymeric membrane modules.

EXAMPLES

The present invention will be further explained by way of specific examples, which are representative and do not restrict the scope of the present invention in any way.

Referential Example 1 (Preparation of Gas-Separating Polymeric Membrane Modules A, B, C, and D)

In accordance with the method described in Japanese Unexamined Patent Publication (Kokai) No. 61-19813, a number of aromatic imide polymer hollow filaments each having an outside diameter of about 380 μm and an inside diameter of about 210 μm were produced from an aromatic imide polymer which was a polymerization product of 100 parts by weight of 3,3',4,4'-biphenyltetracarboxylic dianhydride, 80 parts of weight of a diaminodimethyldiphenylenesulfone isomer mixture and 20 parts by weight of 2,6-diaminopyridine, and then the hollow fibers were connected to polymeric membrane modules A, B, C and D each consisting of about 840 hollow fibers, having an effective gas-separating area (a total outside peripheral surface are of the hollow fibers) of about 0.20 m², an effective fiber length of 200 mm, and exhibiting the gas permeating rates shown in Table 1.

Referential Example 2 (Preparation of Gas-Separating Polymeric Membrane Modules E, F, G and H)

The same hollow filaments as those described in Referential Example 1 were coated with a polymer comprising as a main component, a polysiloxane in accordance with the method disclosed in Example 2 of Japanese Unexamined Patent Publication (Kokai) No. 58-8514, to provide composite hollow fibers having an outside diameter of about 375 μm and an inside diameter of about 210 μm.

The composite hollow filaments were converted to gas-separating polymeric membrane modules E, F, G and H each consisting of about 850 hollow fibers, having an effective gas-separating area of about 0.20 m² (a total outside peripheral surface area of the hollow fibers) and an effective fiber length of 200 mm and exhibiting the gas-permeating rates shown in Table 1.

The gas-permeating rates of the membrane module A to H were measured by permeating pure hydrogen, helium, methane, nitrogen and oxygen gases through each module at a temperature of 45° C. under a pressure of 2 kg/cm²G. The resultant gas-permeating rates are indicated in cm³/cm²·sec·cmHg at a temperature of 0° C. under a pressure of one atmosphere.

TABLE 1

| Type of membrane module | Gas-permeating rate at °C. (N-cm³/cm² sec cmHg) × $10^{-5}$ | | | | |
|---|---|---|---|---|---|
| | $H_2$ | He | $CH_4$ | $N_2$ | $O_2$ |
| A | 6.1 | 8.0 | 0.020 | 0.036 | 0.19 |
| B | 6.2 | 8.1 | 0.021 | 0.039 | 0.20 |
| C | 6.0 | 7.9 | 0.019 | 0.035 | 0.18 |
| D | 6.1 | 8.0 | 0.020 | 0.037 | 0.19 |
| E | 7.3 | 7.2 | 0.16 | 0.21 | 0.44 |
| F | 7.5 | 7.3 | 0.18 | 0.24 | 0.48 |
| G | 7.2 | 7.1 | 0.16 | 0.20 | 0.43 |
| H | 7.3 | 7.2 | 0.17 | 0.22 | 0.45 |

EXAMPLE 1

Figure 10:
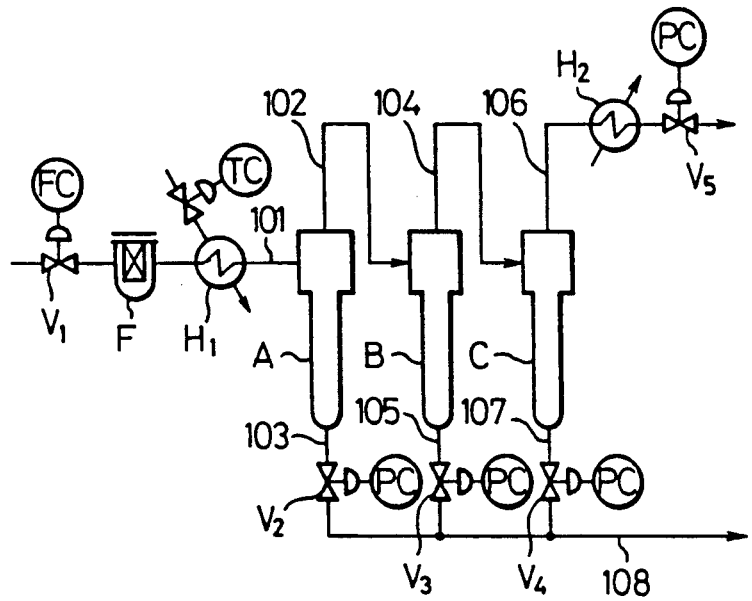
FIGS. 10 to 13 show, respectively, an embodiment of the apparatus for carrying out the method of the present invention; and, FIG. 14 is a flow sheet of a conventional gas-separating method.

The polymeric membrane modules A, B and C mentioned in Referential Example 1 were arranged in series as shown in FIG. 10.

A feed gas consisting of 99 molar % of hydrogen, 0.5 molar % of methane, and 0.5 molar % of nitrogen was fed through a pressure-regulating valve $V_1$, a guard filter F, a temperature-regulator $H_1$ and a feed line 101 into the first membrane module A under the pressure and at the temperature and flow rate shown in Table 2. A first non-permeated fraction of the feed gas was discharged from the first membrane module A through a valve $V_2$ and a flow line 103, and then a flow line 108. A first permeated fraction of the feed gas delivered from the first membrane module A was fed into the second membrane module B through a flow line 102. A second non-permeating fraction of the feed gas was discharged from the second membrane module B through a valve $V_2$ and a flow line 105 and then a flow line 108. A second permeated fraction of the feed gas delivered from the second membrane module B was fed into the third membrane module C through a flow line 104. Then a third permeated fraction of the feed gas delivered from the third membrane module C was collected as a pure hydrogen gas through a flow line 106, a temperature regulator $H_2$ and a valve $V_5$. A third non-permeated fraction of the feed gas has discharged from the third membrane module C through a flow line 107 and then a flow line 108.

Each of the permeated fractions of the feed gas in the flow lines 102, 104, and 116 and the non-permeated fractions of the feed gas in the flow lines 103, 105, 107 and 108 had the pressure, temperature, flow rate, and composition shown in Table 2.

Also, Table 2 shows a percent recovery of hydrogen from the feed gas.

TABLE 2

| Item | Position | Flow line 101 (Feed gas) | Flow line 102 | Flow line 103 | Flow line 104 | Flow line 105 | Flow line 106 (Final product) | Flow line 107 | Flow line 108 |
|---|---|---|---|---|---|---|---|---|---|
| Pressure (kg/cm² · G) | | 17.5 | 11.7 | 17.5 | 7.0 | 11.7 | 3.0 | 7.0 | 0.5 |
| Temperature (°C.) | | 45 | 45 | 45 | 45 | 45 | 45 | 45 | 45 |
| Flow rate (Nm³/H) | | 0.2 | 0.171 | 0.029 | 0.1458 | 0.0255 | 0.1269 | 0.0189 | 0.0731 |
| Composition (Vol %) | $H_2$ | 99.0 | 99.96463 | 93.25026 | 99.99894 | 99.76893 | 99.99998 | 99.99206 | 97.26406 |
| | $CH_4$ | 0.5 | 0.01254 | 3.40556 | 0.00024 | 0.08263 | 0.00000 | 0.00183 | 1.36799 |
| | $N_2$ | 0.5 | 0.02283 | 3.34418 | 0.00082 | 0.14844 | 0.00002 | 0.00611 | 1.36795 |
| Percent recovery of hydrogen (%) | | 64.1 | | | | | | | |

EXAMPLE 2

The same procedures as those described in Example 1 were carried out except that the feed gas had the pressure, temperature, flow rate and composition shown in Table 2.

The results are shown in Table 3.

TABLE 3

| Item | Position | Flow line 101 (Feed gas) | Flow line 102 | Flow line 103 | Flow line 104 | Flow line 105 | Flow line 106 (Final product) | Flow line 107 | Flow line 108 |
|---|---|---|---|---|---|---|---|---|---|
| Pressure (kg/cm² · G) | | 18.2 | 11.6 | 18.2 | 6.9 | 11.6 | 3.0 | 6.9 | 0.5 |
| Temperature (°C.) | | 45 | 45 | 45 | 45 | 45 | 45 | 45 | 45 |
| Flow rate (Nm³/H) | | 0.2 | 0.169 | 0.031 | 0.148 | 0.021 | 0.124 | 0.024 | 0.076 |
| Composition (Vol %) | $H_2$ | 97.0 | 99.89740 | 81.45341 | 99.99711 | 99.16889 | 99.99993 | 99.98284 | 92.10538 |
| | $CH_4$ | 2.0 | 0.05372 | 12.44316 | 0.00109 | 0.43829 | 0.00002 | 0.00651 | 5.26313 |
| | $N_2$ | 1.0 | 0.04888 | 6.10343 | 0.00180 | 0.39282 | 0.00005 | 0.01065 | 2.63149 |
| Percent recovery of hydrogen (%) | | 63.9 | | | | | | | |

EXAMPLE 3

The same procedures as those described in Example 1 were carried out except that the second membrane module consisted of the membrane module C, the third membrane module consisted of the membrane module D described in Referential Example 1, and the feed gas had the pressure temperature, flow rate and composition indicated in Table 4.

The results are shown in Table 4.

TABLE 4

| Item | Position | Flow line 101 (Feed gas) | Flow line 102 | Flow line 103 | Flow line 104 | Flow line 105 | Flow line 106 (Final product) | Flow line 107 | Flow line 108 |
|---|---|---|---|---|---|---|---|---|---|
| Pressure ($kg/cm^2 \cdot G$) | | 18.8 | 11.4 | 18.8 | 6.8 | 11.4 | 3.0 | 6.8 | 0.5 |
| Temperature (°C.) | | 45 | 45 | 45 | 45 | 45 | 45 | 45 | 45 |
| Flow rate ($Nm^3/H$) | | 0.2 | 0.164 | 0.036 | 0.144 | 0.020 | 0.120 | 0.024 | 0.080 |
| Composition | $H_2$ | 95.0 | 99.81143 | 72.68037 | 99.99446 | 98.49687 | 99.99988 | 99.96704 | 87.50018 |
| (Vol %) | $CH_4$ | 3.0 | 0.08525 | 16.52115 | 0.00172 | 0.68516 | 0.00002 | 0.01030 | 7.49997 |
| | $N_2$ | 2.0 | 0.10332 | 10.79840 | 0.00382 | 0.81797 | 0.00010 | 0.02266 | 4.99985 |
| Percent recovery of hydrogen (%) | | 63.2 | | | | | | | |

EXAMPLE 4

The same procedures as those described in Example 1 were carried out with the following exception.

Figure 11:
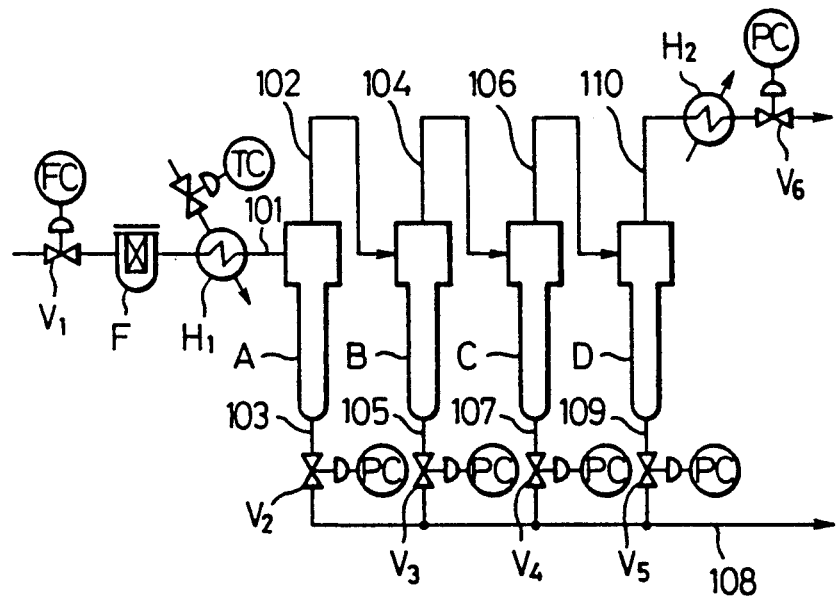
Figure 13:
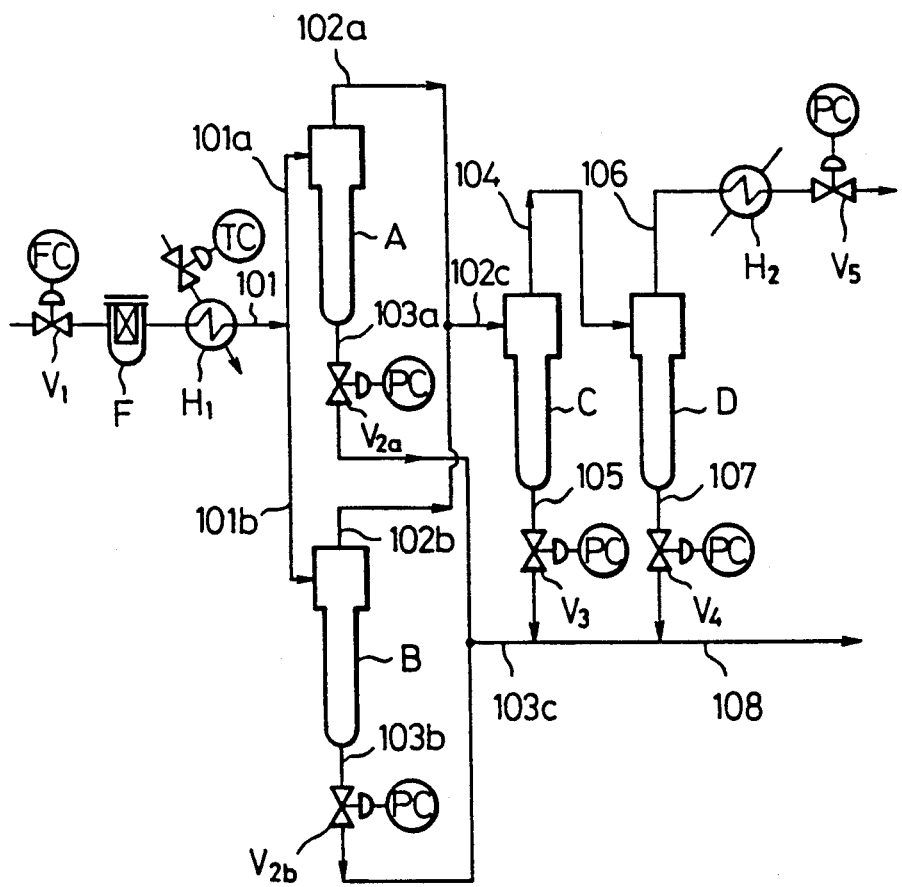

The membrane modules A, B, C and D were arranged in series as indicated in FIG. 11.

The feed gas had the pressure, temperature, flow rate and composition as indicated in Table 5.

The results are shown in Table 5.

COMPARATIVE EXAMPLE 1

The same procedures as those described in Example 1 were carried out except that the first, second and third membrane modules respectively consisted of the membrane modules E, F and G mentioned in Referential Example 2 and the feed gas had the pressure, temperature, flow rate and composition as indicated in Table 6.

The results are shown in Table 6.

TABLE 6

| Item | Position | Flow line 101 (Feed gas) | Flow line 102 | Flow line 103 | Flow line 104 | Flow line 105 | Flow line 106 | Flow line 107 | Flow line 108 |
|---|---|---|---|---|---|---|---|---|---|
| Pressure ($kg/cm^2 \cdot G$) | | 16.4 | 10.4 | 16.4 | 6.4 | 10.4 | 3.0 | 6.4 | 0.5 |
| Temperature (°C.) | | 45 | 45 | 45 | 45 | 45 | 45 | 45 | 45 |
| Flow rate ($Nm^3/H$) | | 0.2 | 0.165 | 0.035 | 0.143 | 0.022 | 0.124 | 0.019 | 0.076 |
| Composition | $H_2$ | 95.0 | 98.97886 | 76.01239 | 99.83129 | 93.36062 | 99.97843 | 98.85155 | 86.87732 |
| (Vol %) | $CH_4$ | 3.0 | 0.55849 | 14.65117 | 0.08275 | 3.69405 | 0.00932 | 0.57166 | 7.87953 |
| | $N_2$ | 2.0 | 0.46265 | 9.33644 | 0.08596 | 2.94533 | 0.01225 | 0.57679 | 5.24315 |
| Percent recovery of hydrogen (%) | | 65.2 | | | | | | | |

COMPARATIVE EXAMPLE 2

The same procedures as those described in Example 4 were carried out except that the first, second, third and fourth membrane modules respectively consisted of the membrane modules E, F, G and H described in Referential Example 2 and the feed gas had the pressure, temperature, flow rate and composition as indicated in Table 7.

The results are shown in Table 7.

TABLE 5

| Item | Position | Flow line 101 (Feed gas) | Flow line 102 | Flow line 103 | Flow line 104 | Flow line 105 |
|---|---|---|---|---|---|---|
| Pressure ($kg/cm^2 \cdot G$) | | 18.4 | 12.2 | 18.4 | 8.6 | 12.2 |
| Temperature (°C.) | | 45 | 45 | 45 | 45 | 45 |
| Flow rate ($Nm^3/H$) | | 0.2 | 0.163 | 0.037 | 0.140 | 0.023 |
| Composition | $H_2$ | 95.0 | 99.53811 | 75.01763 | 99.94295 | 97.06721 |
| (Vol %) | $CH_4$ | 4.0 | 0.21891 | 20.64903 | 0.00930 | 1.49821 |
| | $N_2$ | 1.0 | 0.24298 | 4.33334 | 0.04775 | 1.43458 |
| Percent recovery of hydrogen (%) | | 54.7 | | | | |

| Item | Position | Flow line 106 | Flow line 107 | Flow line 110 (Final product) | Flow line 109 | Flow line 108 |
|---|---|---|---|---|---|---|
| Pressure ($kg/cm^2 \cdot G$) | | 5.6 | 8.6 | 3.0 | 5.6 | 0.5 |
| Temperature (°C.) | | 45 | 45 | 45 | 45 | 45 |
| Flow rate ($Nm^3/H$) | | 0.120 | 0.020 | 0.104 | 0.016 | 0.096 |
| Composition | $H_2$ | 99.99134 | 99.65139 | 99.99872 | 99.94431 | 89.58472 |
| (Vol %) | $CH_4$ | 0.00034 | 0.06327 | 0.00001 | 0.00244 | 8.33332 |
| | $N_2$ | 0.00832 | 0.28534 | 0.00127 | 0.05325 | 2.08196 |
| Percent recovery of hydrogen (%) | | | | | | |

TABLE 7

| Item | Position | Flow line 101 (Feed gas) | Flow line 102 | Flow line 103 | Flow line 104 | Flow line 105 |
|---|---|---|---|---|---|---|
| Pressure ($kg/cm^2 \cdot G$) | | 20.0 | 13.5 | 20.0 | 9.1 | 13.5 |

TABLE 7-continued

| | | | | | | |
|---|---|---|---|---|---|---|
| Temperature (°C.) | | 45 | 45 | 45 | 45 | 45 |
| Flow rate (Nm³/H) | | 0.2 | 0.170 | 0.030 | 0.146 | 0.024 |
| Composition | $H_2$ | 95.0 | 98.45764 | 75.62844 | 99.59116 | 91.36260 |
| (Vol %) | $CH_4$ | 4.0 | 1.08831 | 20.31286 | 0.23692 | 6.41740 |
| | $N_2$ | 1.0 | 0.45405 | 4.055870 | 0.17192 | 2.22000 |
| Percent recovery of hydrogen (%) | | 48.9 | | | | |

| Item | Position | Flow line 106 | Flow line 107 | Flow line 108 | Flow line 109 | Flow line 110 |
|---|---|---|---|---|---|---|
| Pressure (kg/cm² · G) | | 5.6 | 9.1 | 3.0 | 5.6 | 0.5 |
| Temperature (°C.) | | 45 | 45 | 45 | 45 | 45 |
| Flow rate (Nm³/H) | | 0.128 | 0.018 | 0.093 | 0.035 | 0.107 |
| Composition | $H_2$ | 99.90110 | 97.39274 | 99.98119 | 99.68812 | 90.67056 |
| (Vol %) | $CH_4$ | 0.04298 | 1.61257 | 0.00549 | 0.14268 | 7.47186 |
| | $N_2$ | 0.05592 | 0.99469 | 0.01332 | 0.16920 | 1.85758 |
| Percent recovery of hydrogen (%) | | | | | | |

EXAMPLE 5

Figure 12:
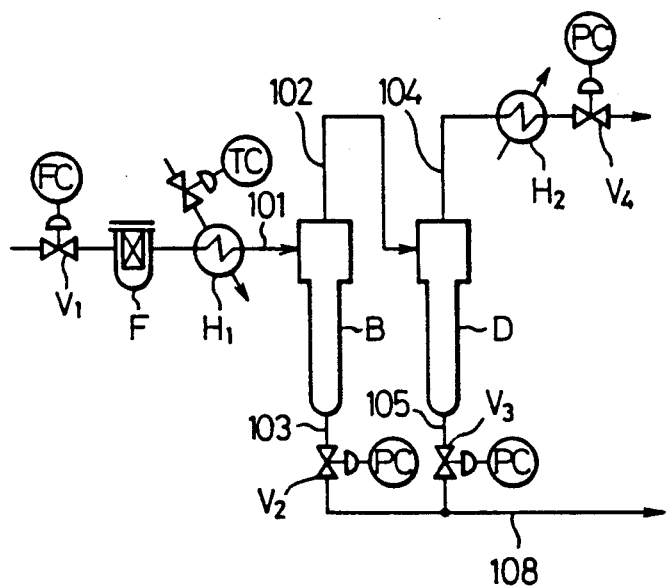

The same procedures as those described in Example 1 were carried out except that the first and second membrane module consisted of the membrane modules B and D as mentioned in Referential Example 1, the third membrane module was omitted as shown in FIG. 12, and the feed gas had the pressure, temperature, flow rate and composition as indicated in Table 8.

TABLE 8

| Item | Position | Flow line 101 (Feed gas) | Flow line 102 | Flow line 103 | Flow line 104 (Final product) | Flow line 105 | Flow line 108 |
|---|---|---|---|---|---|---|---|
| Pressure (kg/cm² · G) | | 13.3 | 7.6 | 13.3 | 3.0 | 7.6 | 0.5 |
| Temperature (°C.) | | 45 | 45 | 45 | 45 | 45 | 45 |
| Flow rate (Nm³/H) | | 0.2 | 0.168 | 0.032 | 0.146 | 0.022 | 0.054 |
| Composition | $H_2$ | 98.7 | 99.96747 | 91.93532 | 99.99935 | 99.76191 | 95.18691 |
| (Vol %) | $CH_4$ | 0.8 | 0.01518 | 4.98869 | 0.00022 | 0.11166 | 2.96240 |
| | $N_2$ | 0.5 | 0.01735 | 3.07595 | 0.00043 | 0.12643 | 1.85069 |
| Percent recovery of hydrogen (%) | | 74.0 | | | | | |

EXAMPLE 6

The same procedures as those described in Example 1 were carried out with the following exception. The feed gas supplied through the flow line 101 was fed into two separate first membrane modules respectively composed of the membrane modules A and B through flow lines 101a and 101b.

The first permeated fractions of the feed gas delivered from the first membrane modules A and B were fed into the second membrane module consisting of the membrane module C through flow lines 102a and 102b and then a flow line 102c. The first non-permeated fractions of the feed gas were discharged from the first membrane modules A and B through flow lines 103a and 103b and then a flow line 103c and a flow line 108.

The third membrane module consisted of the membrane module D.

The results are shown in Table 9.

TABLE 9

| Item | Position | Flow line 101 (Feed gas) | Flow line 102c | Flow line 103c | Flow line 104 | Flow line 105 | Flow line 106 (Final product) | Flow line 107 | Flow line 108 |
|---|---|---|---|---|---|---|---|---|---|
| Pressure (kg/cm² · G) | | 16.2 | 12.0 | 16.2 | 7.2 | 12.0 | 3.0 | 7.2 | 0.5 |
| Temperature (°C.) | | 45 | 45 | 45 | 45 | 45 | 45 | 45 | 45 |
| Flow rate (Nm³/H) | | 0.2 | 0.088 | 0.012 | 0.150 | 0.026 | 0.127 | 0.023 | 0.073 |
| Composition | $H_2$ | 97.0 | 99.78078 | 77.26141 | 99.99403 | 98.48913 | 99.99986 | 99.96265 | 91.78105 |
| (Vol %) | $CH_4$ | 2.0 | 0.11616 | 15.37188 | 0.00227 | 0.80594 | 0.00003 | 0.01431 | 5.47940 |
| | $N_2$ | 1.0 | 0.10306 | 7.36668 | 0.00370 | 0.70493 | 0.00011 | 0.02304 | 2.73955 |
| Percent recovery of hydrogen (%) | | 65.5 | | | | | | | |

We claim:

1. A method for preparing a high purity light gas consisting of a member selected from the group consisting of hydrogen and helium, comprising subjecting a feed gas containing at least 90 molar % of a light gas consisting of a member selected from the group consisting of hydrogen and helium and substantially no carbon dioxide to a gas-separating procedure in 2 to 5 steps through 2 to 5 gas-separating membrane modules, each of said gas-separating membrane modules comprising at least one aromatic imide-polymer gas-separating membrane and having a gas permeating rate ratio $P_A/P_{CH_4}$ of 100 or more, wherein $P_A$ represents a permeating rate of hydrogen or helium and $P_{CH_4}$ represents a permeating rate of methane gas, in such a manner that a fraction of said feed gas, which has permeated through and has been delivered from a preceding gas-separating membrane module, is fed to a next gas-separating membrane module without increasing the pressure of the delivered fraction of the feed gas.

2. The method as claimed in claim 1, wherein said high purity light gas has a purity of 99.99% or more, when a content of water is omitted from the calculation of the purity.

3. The method as claimed in claim 1, wherein said feed gas substantially does not contain moisture.

4. The method as claimed in claim 1, wherein the feed gas to be fed to a first step of gas-separating membrane module has a pressure adjusted to an elevated level, with the result that a fraction of the feed gas, which has permeated through and has been delivered from a last step of gas-separating membrane module, exhibits a pressure of 30 mmHg Abs or more.

5. The method as claimed in claim 4, wherein the fraction of the feed gas delivered from the last step of the gas-separating membrane module exhibits at least an ambient atmospheric pressure.

6. The method as claimed in claim 1, wherein each fraction of the feed gas which has not permeated through each gas-separating membrane module is fed to an additional gas-separating polymeric membrane module to recover the light gas from the non-permeated fraction.

7. The method as claimed in claim 1, wherein a fraction of the feed gas which has not permeated through the gas-separating membrane module in any of from the second to the last steps, is returned to a preceding step gas-separating membrane module, to recover the light gas from the non-permeated fraction.

8. The method as claimed in claim 1, wherein the gas-separating procedure is carried out at a temperature of from $-70°$ C. to $120°$ C.

* * * * *